United States Patent [19]

Mordarski et al.

[11] 4,131,511

[45] Dec. 26, 1978

[54] NUCLEAR FUEL ELEMENT

[75] Inventors: Walter J. Mordarski, Wallingford, Conn.; Jerome Roth, Royersford, Pa.

[73] Assignee: Combustion Engineering, Inc., Windsor, Conn.

[21] Appl. No.: 765,462

[22] Filed: Feb. 4, 1977

[51] Int. Cl.² ............................................. G21C 3/02
[52] U.S. Cl. ...................................... 176/68; 176/78; 267/0.5
[58] Field of Search .............................. 176/68, 76, 78; 264/0.5

[56] References Cited

U.S. PATENT DOCUMENTS

| 3,042,598 | 7/1962 | Crowther | 176/68 X |
|---|---|---|---|
| 3,106,520 | 10/1963 | Wolfe et al. | 176/68 X |
| 3,180,804 | 4/1965 | Flora et al. | 176/68 X |
| 3,666,846 | 5/1972 | Sump et al. | 264/0.5 |
| 3,778,348 | 12/1973 | Sease et al. | 264/0.5 |
| 3,804,708 | 4/1974 | Nilson | 176/68 |
| 3,880,769 | 4/1975 | Googin et al. | 264/0.5 X |
| 3,887,486 | 6/1975 | Googin et al. | 264/0.5 X |
| 3,926,832 | 12/1975 | Barosi | 252/181.6 |

FOREIGN PATENT DOCUMENTS

| 231102 | 11/1960 | Australia | 252/181.6 |
|---|---|---|---|
| 2237676 | 3/1973 | Fed. Rep. of Germany | 264/0.5 |

Primary Examiner—Peter A. Nelson
Attorney, Agent, or Firm—Arthur L. Wade

[57] ABSTRACT

A nuclear fuel pin is formed of an elongated metallic tube, closed at each end, containing stacked fuel pellets and material including little, or no, fissionable material, and formed into porous, or bubbled, microspheres placed in the annulus between the pellets and the internal wall of the tube.

9 Claims, 1 Drawing Figure

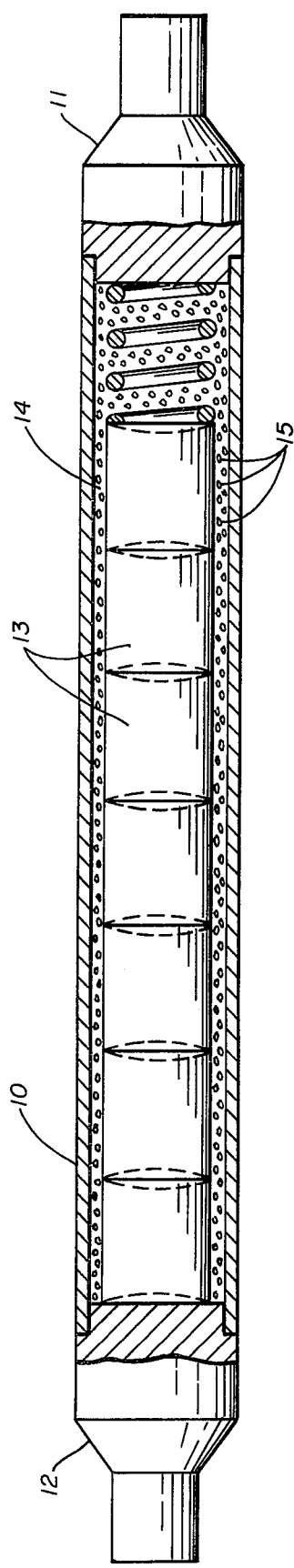

NUCLEAR FUEL ELEMENT

BACKGROUND OF THE INVENTION

1. Field of the Invention

The present invention relates to the protection of the wall of a light water reactor fuel pin from internal forces of the pin. More particularly, the invention relates to mechanical insulation of the fuel pellets from the fuel pin cladding with material provided in a form which will lengthen the pin life.

2. Description of the Prior Art

The accepted material for the casing of fuel pins of a light water reactor is a zirconium alloy. The fuel pellets are stacked within a tube of this alloy. In dimension, these tubes are only in the order 7/16 inches in diameter, but their length is in the order of eleven feet. Water within the reactor is flowed over the pin surface while fissioning of the fuel pellets within the pin generates the heat absorbed by the water. The temperature of the water is raised to the order of 600° F. and is then used to generate steam.

If rupture of the pin wall occurs, various fission products are released from inside the pin and contaminate the primary water system of the reactor. There may be one or more reasons for failure of the cladding, or tube wall.

Mechanical reasons for failure of the pin wall can be physical interactions between the pellets of ceramic fuel, such as $UO_2$ or $(UPu)O_2$, and the pin cladding. Thermal expansion rates of the pellets and their clad are different. The fuel pellets may also densify by approximately 1–2%. Thermal gradients within the pellets cause them to crack. These factors cause movement of the pellets relative to each other and the internal wall of the clad.

The result of the relative movement between pellets and clad is that some pellets restack, leaving small gaps along the length of the pellet column. The large hydrostatic pressure external to the pin causes the tube wall to creep down into any void space. The high stresses which result at the gap edges cause clad failure.

Thermally, there can be localized melting of the clad from within. If the fuel pellets, or material surrounding the fuel pellets, are fabricated from a mixture of powdered uranium oxide and plutonium oxide, agglomerates of plutonium oxide may form, ranging up to 500 microns in size. On a power transient, these agglomerates can melt. If an agglomerate of plutonium oxide comes in contact with a clad of zirconium alloy, there can be a localized meltdown which will rupture the clad.

Also, certain fission fragments produced in the fuel during reactor operation such as iodine and cesium can migrate from the hot fuel to the cooler clad. The iodine then reacts with the clad, causing it to fail by the mechanism of iodine stress corrosion cracking.

The prior art has at least one system which discloses insulation of fuel pellets from their clad. The disclosure of U.S. Pat. No. 3,778,348 specifically discloses microspheres of fuel in the annulus between the fuel pin clad and the pellets. Interaction between fuel pellets and clad is reduced by this isolation. However, the disclosed fuel microspheres are quite dense and hard. Material of this density and hardness severely reduces the space allowance of the annulus for dimensional changes in the fuel pellets. Also, the microspheres of fuel are disclosed as produced from a powdered form that is not purely homogeneous in the distribution of the plutonium. Therefore, agglomerates of plutonium oxide microspheres occur near the inner wall of the clad and generate local hot spots in the clad during core operation.

In summation, the prior art is seen to have both mechanical and thermal problems in operating fuel pins including ceramic fuel pellets isolated from the internal zircoloy wall of the pin with microspheres of fuel containing fissionable plutonium isotopes. First, the prior art material of hard, dense microspheres in the annulus between the pellets and wall does not provide sufficient volume to accommodate dimensional expansion of the pellets during core operation. The result is mechanical stress on the clad which can cause it to rupture.

Second, the prior art uses microspheres of material containing fissionable plutonium isotopes. The plutonium isotopes have not been evenly distributed and agglomerates of this element have been positioned next to the pin wall. The result can be localized meltdown of the zircoloy clad.

SUMMARY OF THE INVENTION

It is a principal object of the invention to form material having substantially no fissionable elements into friable, porous, low density microspheres and position the material in the annulus of a nuclear fuel pin between the column of fuel pellets and the internal wall of the clad.

Another object is to fabricate the microspheres to have specified irradiation sintering densification properties.

It is another object to include getter materials with the microspheres for fission products such as iodine and cesium.

Another object is to include a burnable poison with the microspheres.

Another object is to include a tracer isotope with the microspheres.

The present invention contemplates $UO_2$ with depleted uranium or $ZrO_2$ or $CeO_2$ or mixtures thereof formed into porous or "bubbled" microspheres with a controlled density and a controlled crushing strength placed in the annulus between a column of fuel pellets and their clad of zirconium alloy.

More specifically, the invention contemplates mixing a getter material for iodine and cesium, a burnable poison and a tracer isotope with the porous microspheres of material.

Other objects, advantages and features of the invention will become apparent to one skilled in the art upon consideration of the written specification, appended claims, and attached drawing.

DRAWING DESCRIPTION

The single FIGURE is a sectioned elevation of a nuclear fuel pin disclosing fuel pellets isolated from the clad wall with material in the form of porous microspheres and embodying the invention.

DESCRIPTION OF THE PREFERRED EMBODIMENT

The drawing is a simple illustration of the basic structure of a nuclear fuel element, or pin. A cylindrical casing 10, or clad, is closed on its end by caps 11 and 12.

The clad with which the present invention is primarily concerned is zirconium alloy. This material is desirable for light water reactors. However, it loses substantial strength as it approaches 800F, compared with stainless steel which exhibits substantial strength at 1200F. Therefore, this invention is particularly concerned with the protection of the zirconium alloy clad of a nuclear fuel pin.

Within the casing 10 is disclosed a stack of loose-fitting cylindrical pellets 13. Annulus 14 is formed between the stack and internal wall of casing 10. The fuel pellets 13 are conventional ceramic nuclear material, such as $UO_2$ or $(UPu)O_2$. This is a widely accepted structural form for fuel pins of the light water reactor.

The present invention comes down to concern with placing particular material, having specific form in the annulus 14. One practice of the past is to fill annulus 14 with helium. Another practice, disclosed in U.S. Pat. No. 3,778,348, is to fill annulus 14 with microspheres of $UO_2$ or $(UPu)O_2$. It is the teaching of the present invention to fill annulus 14 with depleted $UO_2$ or $ZrO_2$ or $CeO_2$ mixtures fabricated into porous or "bubbled" microspheres 15. More specifically, this material is fabricated to have a controlled density and friable with a controlled crushing strength.

When fuel pellets 13 swell with increasing burnup, their outward pressure will result in a gradual crushing of the bubbled microspheres 15. Therefore, the swelling will be mechanically accommodated. The fragmented and uncrushed microspheres 15 will continuously function to prevent binding between the fragmented pellets 13 and the internal wall of clad 10. The material can be described as a sliding, lubricating, interface between the pellets 13 and clad 10. Fuel-clad interaction is prevented while fuel swelling is accommodated.

The invention solves both the mechanical problem of fuel-clad interaction and the problem of irradiation induced swelling of the fuel pellets. It has been the practice to form fuel pellets with dished ends. This configuration is basically designed to provide a dimensional allowance for axial thermal expansion. However, infiltration of the dished-end volume of stacked fuel pellets by any powdered material in annulus 14 is inevitable.

If the spherical material disclosed in U.S. Pat. No. 3,778,348 were positioned in annulus 14, that hard, high density, material would drastically deplete the volume intended for thermal expansion on the end of the fuel pellets. The dished effectiveness would be destroyed. With the present invention, porous, or bubbled, microspheres 15 of $UO_2$ having depleted uranium, or $ZrO_2$, or $CeO_2$, or mixtures are fabricated to the low density that will result in very little volume being lost by their infiltration.

The plutonium agglomerates of the prior art microspheres generate hot spots in the clad during core operation. As analyzed supra, the microspheres of the prior art are fabricated from a powdered material that is not homogeneous in the distribution of the plutonium isotopes. Therefore, the agglomerates formed near the inner wall of the clad can generate local hot spots in the clad which can lead to its failure.

Uranium in the microspheres 15 was originally in the form of a gas and therefore homogeneous in its distribution of fissionable material. Further, a source of low enrichment uranium is the tails of the uranium diffusion enrichment process. This enrichment is in the order of 0.2 weight percent U-235. Therefore, very little fissioning takes place in the microspheres 15. If $ZrO_2$ or $CeO_2$ microspheres are fabricated, there will, of course, be no fissioning. Thus, the microspheres 15 of the present invention minimize the thermal problems of the prior art by (a) obviating agglomerates of plutonium, (b) being fabricated into microspheres with fissionable material of very low enrichment $(UO_2)$ or (c) being fabricated into microspheres with no fissionable material such as $ZrO_2$ or $CeO_2$.

Additionally, it may be desirable to include getter material in the structure. Getter material for such fission products as iodine and cesium are well known and desirable within fuel pins. Iodine and cesium will attack the grain boundaries of clad material and result in cracking-failure of the pin wall. Any getter materials desired can be readily incorporated in the bubbled microspheres 15 and distributed, with them, throughout the volume of the fuel pin.

Any burnable poison desired in the fuel pin can be included in the microsphere fabrication. The result is a less expensive fabrication than the prior art procedure in which the burnable poison was included during fuel pellet fabrication. Therefore, it is a concept of the present invention to include a burnable poison as well as the getter.

The actual loading of microspheres 15 about pellets 13, within casing 10, can be carried out with vibration. Vibratory compaction is a well-known technique used to distribute small granules of material along a fuel pin. The technique is discussed at some length in the disclosure of U.S. Pat. No. 3,778,348 which refers to the conventional vibratory apparatus used in the process of U.S. Pat. No. 3,261,378.

In none of the disclosure of vibratory compaction is there found an adequate system for determining the final distribution of microspheres. It is a concept of the present invention to ascertain how microspheres 15 are distributed with vibratory compaction by including a tracer isotope with the material of the microspheres.

The presence of a tracer isotope would not interfere with the function of the fuel pin. At the time of fabrication, the distribution of the isotope would give a positive indication of the location of the microspheres along the length of the fuel pin. Thus, the invention provides a non-destructive method for quality control of the uniformity of material vibrated into position along the length of the fuel pin.

SUMMATION

The invention is in a fuel pin having a tubular Zircoloy casing, closed at each end. Fuel pellets are stacked within the casing and isolated, or insulated, from the internal wall of the casing with depleted Uranium, $ZrO_2$ or $CeO_2$ in the form of porous microspheres fabricated to a controlled density and a controlled crushing strength.

The invention additionally contemplates the inclusion of other useful material with the porous microspheres of material. Helium may be included. Getter material for iodine and cesium may be distributed through the pin, mixed with the porous microspheres. A burnable poison is readily included. Finally, a tracer isotope may be mixed with the porous microspheres and used as a tool to test for the distribution obtained with vibratory compaction techniques.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations.

This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

The invention, having been described, what is claimed is:

1. A fuel pin for a nuclear reactor, including,
a casing of zirconium alloy formed into a tube which is closed at each end, a stack of axially aligned nuclear fuel pellets positioned within the casing, and material formed into microspheres which are friable with a controlled crushing strength and which are porous with a controlled density and having substantially no fissionable components positioned in the annulus between the stack of pellets and the internal wall of the casing.

2. The fuel pin of claim 1, wherein,
the microspheres are of uranium oxide in which the uranium is depleted.

3. The fuel pin of claim 1, including,
a tracer isotope distributed in the body formed into the microspheres.

4. The fuel pin of claim 1, wherein,
the microspheres are of zirconium oxide.

5. The fuel pin of claim 1, wherein,
the microspheres are of cesium oxide.

6. The fuel pin of claim 1, wherein,
the microspheres are mixtures of depleted uranium and cesium oxide and zirconium oxide.

7. The fuel pin of claim 1, including,
helium included in the annulus and microspheres.

8. The fuel pin of claim 1, including,
getter material for iodine and cesium distributed in the body formed into the microspheres.

9. The fuel pin of claim 1, including,
a burnable poison distributed in the body formed into the microspheres.

* * * * *